US012383862B2

(12) United States Patent
van Kessel et al.

(10) Patent No.: US 12,383,862 B2
(45) Date of Patent: Aug. 12, 2025

(54) GAS STREAM ENRICHMENT USING SILICONE SEPARATOR CASCADES

(71) Applicant: International Business Machines Corporation, Armonk, NY (US)

(72) Inventors: Theodore G. van Kessel, Millbrook, NY (US); Stacey Gifford, Ridgefield, CT (US); Benjamin Hardy Wunsch, Mt. Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 18/127,469

(22) Filed: Mar. 28, 2023

(65) Prior Publication Data

US 2024/0325967 A1    Oct. 3, 2024

(51) Int. Cl.
    *B01D 53/22*    (2006.01)
    *B01D 69/02*    (2006.01)
    (Continued)

(52) U.S. Cl.
    CPC .......... *B01D 53/226* (2013.01); *B01D 53/227* (2013.01); *B01D 53/228* (2013.01);
    (Continued)

(58) Field of Classification Search
    CPC ................ B01D 53/226; B01D 53/227; B01D 71/0213; B01D 69/107; B01D 69/108;
    (Continued)

(56) References Cited

U.S. PATENT DOCUMENTS

| | | |
|---|---|---|
| 4,119,417 A | 10/1978 | Heki |
| 5,089,033 A | 2/1992 | Wijmans |

(Continued)

FOREIGN PATENT DOCUMENTS

| | | |
|---|---|---|
| CA | 2915675 A1 | 1/2017 |
| EP | 2588216 A2 | 5/2013 |
| EP | 2996794 B1 | 9/2018 |

OTHER PUBLICATIONS

Anon, "Separation Theory", 2021, Federation of American Scientists, FAS, 5 pps., <https://fas.org/issues/nonproliferation-counterproliferation/nuclear-fuel-cycle/uranium-enrichment-gas-centrifuge-technology/separation-theory/>.

(Continued)

*Primary Examiner* — Anthony R Shumate
(74) *Attorney, Agent, or Firm* — Michael A. Petrocelli

(57) ABSTRACT

An apparatus for enriching a target gas from a gas mixture. The apparatus includes a cascading series of parallel arrangements of a plurality of gas separator cells. The gas separator cells of a second stage receive the output of gas separator cells of a prior stage as input. A gas separator cell includes an input portion, and a depleted gas outlet that is fed to an input of another gas separator cell or fed back to upstream stages. The outlet of a current stage connects to an input inlet of a subsequent stage. The input and output portions of the gas separator cell connect to form a chamber formed by connection of the input portion and the output portion and which includes a gas permeable membrane, selective to a target gas. The gas separator cell includes a gas permeable material supporting the gas permeable membrane.

15 Claims, 3 Drawing Sheets

(51) Int. Cl.
*B01D 69/10* (2006.01)
*B01D 71/02* (2006.01)

(52) U.S. Cl.
CPC ........... *B01D 69/02* (2013.01); *B01D 69/107* (2022.08); *B01D 69/108* (2022.08); *B01D 71/0213* (2022.08); *B01D 2257/504* (2013.01); *B01D 2325/04* (2013.01)

(58) Field of Classification Search
CPC .................. B01D 53/228; B01D 69/02; B01D 2257/504; B01D 2325/04
See application file for complete search history.

(56) References Cited

U.S. PATENT DOCUMENTS

| | | | | |
|---|---|---|---|---|
| 5,447,555 | A * | 9/1995 | Ye | C01B 13/0251 96/9 |
| 6,444,011 | B2 | 9/2002 | Li | |
| 8,999,279 | B2 | 4/2015 | Wright | |
| 2007/0125537 | A1* | 6/2007 | Lokhandwala | B01D 53/22 166/308.4 |
| 2012/0000355 | A1* | 1/2012 | Sharma | B01D 53/226 95/12 |
| 2013/0098242 | A1* | 4/2013 | Ungerank | B01D 53/227 96/10 |
| 2016/0083254 | A1* | 3/2016 | Lim | B01D 53/22 95/47 |
| 2016/0288047 | A1* | 10/2016 | Fukuda | B01D 53/22 |
| 2017/0368497 | A1* | 12/2017 | Priske | B01D 53/226 |
| 2018/0264412 | A1* | 9/2018 | Toet | B01D 63/12 |
| 2021/0023500 | A1* | 1/2021 | Reese | B01D 53/227 |
| 2021/0061706 | A1* | 3/2021 | Novek | C01B 32/50 |
| 2021/0261427 | A1* | 8/2021 | Novek | C01F 11/06 |
| 2023/0271130 | A1* | 8/2023 | Priske | B01D 53/227 96/7 |
| 2024/0278170 | A1* | 8/2024 | Priske | B01D 53/228 |

OTHER PUBLICATIONS

Bulgakov, "Construction and optimization of a separation cascade in the gas-dynamic method of separation", 1986, Atomic Energy, 61, 1050-1055, 10.1007/BF01127274.
Geldenhuys, "Design of an Asymmetric Ideal Cascade for Isotope Enrichment", 1979, Siam Review, 21, 390-394.
Glover, "Petrophysics MSc Course Notes", 2000, 23, 11 pps.
Li et al., "Gas permeability of high-temperature-resistant silicone polymer-vycor glass membrane", 1988, Journal of Membrane Science, 37, 267-275.
Olander, "Two-up, one-down ideal cascades for isotope separation", 1976, Nuclear Technology, 29, 108-112.
Vonhalle, "Cascade design considerations for cascades composed of stages with large separation factors", K/OA-1475, 26 pps., 1978.
Wolf et al., "A General Method for the Calculation of an Ideal Cascade with Asymmetric Separation Units", 1976, Industrial & Engineering Chemistry Fundamentals, 15, 15-19.
Yamashita, "A Method of Calculation on a Step Cascade with Side Flow for Enriching Uranium", 1972, Journal of Nuclear Science and Technology, 9, 721-726.
Yamashita, "Methods of Calculation on a Step Cascade for Enriching Uranium", Journal of Nuclear Science and Technology, 9:8, 480-489, 1972.
Zhang, "The Permeability Characteristics of Silicone Rubber", 10 pps., Copyright © 2006 by SAMPE—Society for the Advancement of Material and Process Engineering, Coatings and Sealants Section, Nov. 6-9, 2006, Dallas, TX, ISBN 978-0-938994-72-5.

* cited by examiner

GAS STREAM ENRICHMENT USING SILICONE SEPARATOR CASCADES

BACKGROUND

The present invention relates to selective gas enrichment, and more specifically, to generating an enriched carbon dioxide concentration from a dilute gas stream.

The continued global use of fossil fuels as an energy source for heat, transportation, and production of other energy sources contributes to anthropomorphic greenhouse gas (GHG) emissions, which are understood to play a significant role in climate change. Among the GHG emissions of greatest concern is carbon dioxide ($CO_2$). Analysis of current levels of carbon dioxide emissions into the atmosphere is in the order of double the rate at which natural "sinks", which remove carbon from atmospheric gas, can absorb the carbon dioxide emissions, which results in a constant increase in the level of carbon dioxide in the atmosphere.

A variety of techniques and forms of capturing carbon dioxide are known or proposed, including the use of temperature swing amine processes to absorb and purify $CO_2$, liquefaction, and pressure swing absorption into materials including but not limited to zeolites and metal-organic frameworks. Most, if not all, of these prior art techniques and forms of $CO_2$ capture benefit from the pre-enrichment of carbon dioxide gas streams. For the case of amine capture, this is particularly true, because the volume of gas processed limits the lifetime of the amine solution in which the $CO_2$ is captured.

Known methods of removal of gaseous carbon dioxide include the use of an absorbent carrier in contact with a membrane surface, which provides the removal of carbon dioxide from a gas flow but is limited by the saturation levels of the carrier, the efficiency of the membrane, and does not enrich concentrations. Other current techniques and apparatus for separating gases use separation stages of a feed stream by applying a compressor used on a feed side and a vacuum pump on the output side to generate a partial pressure difference.

In particular, the current state of the art includes methods, techniques, and apparatus to capture, immobilize, and remove carbon dioxide from gas mixture streams, however, there is a need to enrich the carbon dioxide concentration from gas mixtures that have low concentration, dilute levels of carbon dioxide, such as atmospheric gas. Gas streams of higher carbon dioxide concentrations improve the effectiveness and efficiency of carbon dioxide removal.

Other known methods suggest the use of dual gas separator cells fitted with gas permeable membranes; however, the dual cell use limits the level of enrichment that can be attained and limits gas volume processed.

Embodiments of the present invention co-exist with current capture and immobilize processes and further enable the capture of carbon dioxide by enabling higher levels of enrichment concentration using multiple sets of separator cells in a cascading series arrangement. The apparatus assembly further enables the prior art resulting in an overall ability to effectively capture and enrich carbon dioxide gas streams from low atmospheric to intermediate concentrations (e.g., 0.04% to 10+ %).

Previous methods, apparatus, and techniques have focused on the removal of carbon dioxide from intermediate concentrations of gas flows, assuming the availability of the intermediate levels.

SUMMARY

Embodiments of the present disclosure include an apparatus for enriching dilute gas streams. The apparatus includes a plurality of gas separator cells including a first set configured in a parallel arrangement constituting a first stage, and one or more subsequent stages including respective subsequent sets of gas separator cells configured in a parallel arrangement within a respective stage. The apparatus, also referred to as a/the gas concentrator or enrichment assembly, includes a gas separator cell of a respective subsequent stage receiving as input the output of a corresponding gas separator cell of a prior stage. A gas separator cell of the plurality of gas separator cells includes an input portion that includes a gas inlet orifice and a depleted gas outlet orifice, the input portion connected to an outlet portion that includes an outlet orifice. The outlet orifice of a current stage connects to a corresponding separator cell input portion inlet orifice of a subsequent stage. The gas separator cells of the apparatus include a chamber formed by an air-tight connection of the input portion and the output portion with a gas-permeable membrane, selective to a target gas, bifurcating the chamber. The output portion of the chamber of the gas separator cell includes a gas-permeable material supporting the gas-permeable membrane.

The depleted gas outlet of a first gas separator cell of the parallel arrangement of the first stage connects to an input feed of a second gas separator cell of the first stage, and the depleted gas outlet of an "nth" gas separator cell of the first stage connects to an exhaust output. The depleted gas outlet of an "nth" gas separator cell of a second stage connects to an input feed of the first gas separator cell of the first stage. The apparatus includes at least one multichannel pump head and pump motor connected to and providing pressurization of the depleted gas outlet flow to respective input feeds, and a final stage output of respective gas separator cells of the final stage.

An advantageous aspect of the apparatus includes a selective gas-permeable membrane constructed of silicone or silicone rubber. Another advantageous aspect of the apparatus includes the selective gas permeable membrane of silicone having a typical thickness of 20 microns or less. The 20-micron thickness membrane is readily available and affordable, with thinner versions possible that can improve permeation rates.

An advantageous aspect of the apparatus includes the construction of the gas-permeable material supporting the selective gas-permeable membrane to be of open-cell polyurethane foam. An alternative aspect of the apparatus includes the gas-permeable material supporting the gas-permeable membrane to be constructed of sintered metal or metal foam material. The supporting material protects the gas-permeable membrane integrity while having minimal impact on carbon dioxide permeation or gas flow.

An advantageous aspect of the apparatus includes selecting the gas-permeable material supporting the selective gas-permeable membrane to have a surface roughness similar in magnitude to the thickness of the selective gas-permeable membrane. Gas permeable material supporting the selective gas permeable membrane that has a surface roughness greater than that of the membrane risks damage to the membrane and loss of the selective permeation integrity.

An advantageous aspect of the apparatus includes the construction of the gas separator cell to be made of polymethylmethacrylate (PMMA) material. Gas separator cells made of PMMA material are resilient to most temperature, humidity, and chemical contact conditions, offering a long-life reliable separation cell.

Another advantageous aspect of the apparatus includes constructing the input orifice tubes, the output orifice tubes, and the depleted gas outlet orifice tubes, which connect to the orifices of the input portion and output portion of the gas separator cell. The orifice tubes can be made of metal or plastic materials that offer adequate rigidity for reliable orifice connections. Consideration of specific metal or plastic material should include environmental conditions that may reduce the integrity of the connection seal between the input portion and the output portion of the gas separator cell.

An advantageous aspect of the apparatus includes varying the size of the gas permeable membrane of a gas separator cell corresponding to a respective stage to maintain a desired pressure profile of the enrichment assembly (gas concentrator), comprising a cascading series of parallel arrangements of gas separator cells or alternatively, maintaining a constant area of gas permeable membranes in gas separator cells by applying variable pressures at respective stages using a multichannel pump.

An advantageous aspect of the apparatus includes managing the pressurization of input flow and re-pressurizing feedback flow by applying a multichannel pump to the apparatus, such that independent channels are applied to respective stages of the enrichment assembly. In embodiments of the present invention, the pressure of the gas separator cells of respective stages is controlled by a channel of a multichannel pump, and the inlet and outlet pressures. Embodiments of the present invention select a number of sequential stages and the number of gas separator cells within a parallel arrangement of a stage to achieve a desired enrichment goal and throughput level. Utilizing a multichannel pump or pump with stackable pump heads enables multiple-stage assemblies that include multiple gas separator cells within a parallel arrangement of a stage, to manage the pressurization of multiple stages, without the expense and complexity of requiring individual pumps and associated control mechanisms for each stage.

Many kinds of pumps could be used for enrichment assembly pressurization purposes including but not limited to a peristaltic pump, rotary lobe pump, progressive cavity pump, rotary gear pump, piston pump, diaphragm pump, screw pump, gear pump, and scroll pump. An aspect of the pump providing an efficiency and effectiveness advantage includes having the multiple pumping mechanisms connected to or stacked on, a single motor shaft. For multiple pumping mechanisms (i.e., pump heads) connected to a single motor shaft, a peristaltic pump is particularly advantageous and is a preferred embodiment. The multichannel pump can be used to manage throughput and enrichment by providing constant stage pressure and varying the gas permeable membrane area size of a separator cell or standardizing the membrane area size and varying the pressure at each stage by variable pressure control of respective channels of the multichannel pump. An advantage of using a multichannel pump is that the amount of pressurization and flow can vary with the concentration at each stage, such as when the concentration of carbon dioxide increases, the flow through a given cell increases.

In some embodiments of the present invention, a computer-implemented method may be implemented to enable control of gas flow throughput and gas separator cell pressure for each stage of a series of cascading stages. The computer-implemented method may include valving and pump channel pressure control to attain a desired balance of enrichment of the carbon dioxide target gas and throughput flow by pressurization of respective stages.

DETAILED DESCRIPTION

Figure 1A:
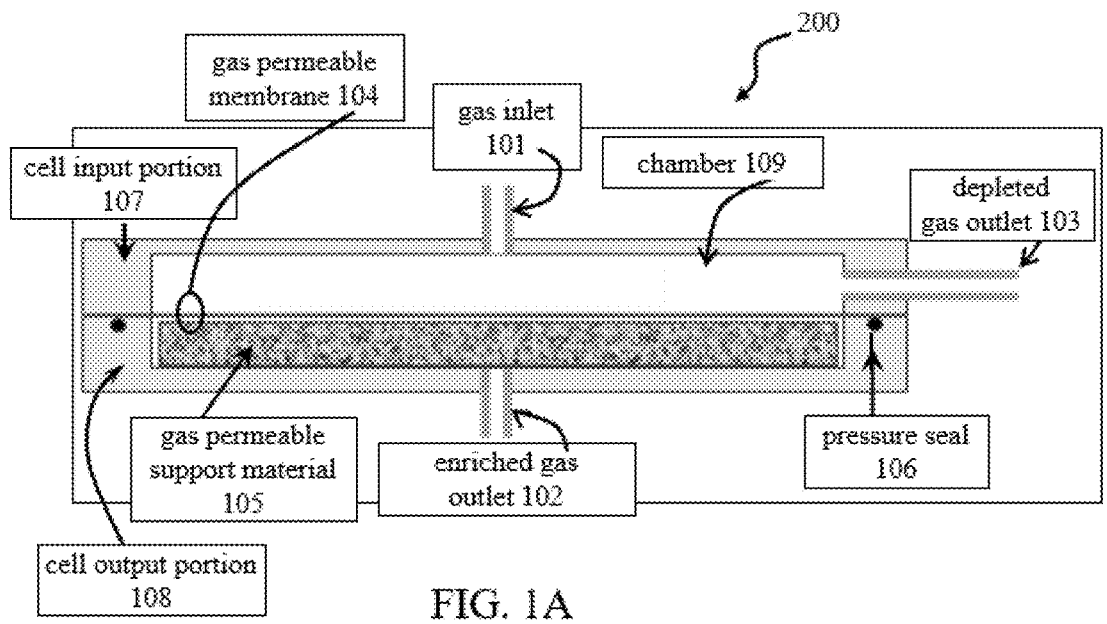
FIG. 1A is a functional block diagram illustrating a gas separation cell, in accordance with an embodiment of the present invention.

Embodiments of the present invention recognize that increasing levels of carbon dioxide ($CO_2$) in the atmosphere increases heat retention. Carbon dioxide is considered a greenhouse gas (GHG) that absorbs and radiates heat. Adding more carbon dioxide to the atmosphere eventually causes global temperatures to rise. Additional carbon dioxide in the atmosphere will dissolve additional carbon dioxide into ocean waters, raising the acidity level of the ocean surface waters. Embodiments recognize that natural "sinks" of carbon removal from the atmosphere can't keep pace with the emissions added to the atmosphere by the burning of fossil fuels, meaning that the levels of carbon dioxide are currently at the highest level seen.

Embodiments of the present invention, recognize that carbon emissions into the atmosphere are increasing at rates that cannot be contained or removed by naturally occurring carbon "sinks", resulting in continual increases. Increasing levels of carbon dioxide in the atmosphere result in increasing global temperatures that contribute to accelerated climate change. Climate change can change weather patterns resulting in flooding, drought, wind patterns, and ocean currents, which can result in increases in dangerous weather, impacts to economies, and damage to food supplies, among other impacts.

Embodiments of the present invention recognize the need for actions and techniques to capture and immobilize GHGs, particularly carbon dioxide from exhaust streams of fossil fuel burning and from atmospheric gas. To accomplish the capture and immobilization of carbon dioxide and other GHGs, the target gas, which may exist at a relatively dilute level as compared to other main component gases in atmospheric air and exhaust, must be enriched by increasing the concentration of the target gas making removal or immobilization actions more effective and efficient and in some cases even possible. Existing and proposed methods of capture and immobilization of carbon dioxide gas typically require enrichment of the concentration well above the 0.04% found in atmospheric gas.

Known approaches and apparatuses exist in a variety of forms including the use of materials and processes that absorb and purify $CO_2$. Existing forms of carbon dioxide capture and immobilization typically rely on the pre-enrichment of carbon dioxide gas streams, significantly greater than atmospheric levels of $CO_2$. The reliance on pre-enrichment capture is particularly important in cases in which the volume of gas processed limits the lifetime of the absorbing material.

Embodiments of the present invention co-exist and further enable current methods and apparatuses for capturing and immobilizing carbon dioxide by effectively enriching the carbon dioxide gas concentration from low atmospheric to intermediate concentrations (e.g., 0.04% to 10%+), improving the effectiveness and efficiency of carbon dioxide capture and removal.

Embodiments of the present invention provide an apparatus that includes multiple gas separation cells in a parallel arrangement forming a stage and connecting multiple stages in a cascading series, such that each stage receives the enriched gas content of the previous stage, enabling further enrichment. The known art does not apply the concept of multiple separator cells in a parallel arrangement, in a cascading series of parallel arrangements, referred to herein as an/the enrichment assembly, applied to gas separation and enrichment of carbon dioxide concentration from a gas mixture flow. The advantages realized from embodiments of the present invention enable a balance in achieving increased enrichment by increasing the number of stages parallel arrangements and managing throughput by the number of gas separation cells included in respective parallel arrangements of a stage.

An aspect of the invention includes the crossflow of depleted gas flows of a first separator cell within a parallel arrangement to the input gas flow of a second separator cell within a parallel arrangement, and the depleted gas flow of an "nth" separator cell of the parallel arrangement is directed as feedback flow to a first separator cell of a prior stage parallel arrangement.

An aspect of the invention includes a plurality of gas separator cells in which a respective gas separator cell includes an input portion that includes a gas inlet orifice and a depleted gas outlet orifice. Within a parallel arrangement of gas separator cells, the input portion of the gas separator cell is aligned with and connected to an outlet portion that includes an outlet orifice, the outlet orifice of the gas separator cell connects to a corresponding separator cell input portion inlet orifice of a subsequent stage. The aligned connection of the input portion and the output portion of the gas separator cell creates a chamber space within the combined connection. The chamber space is bifurcated by a gas-permeable membrane separating the input portion and the output portion. In some embodiments, an advantage is realized by using a readily available silicone membrane as the gas-permeable membrane.

In some embodiments, the gas separator cell that includes the gas permeable membrane is enabled to separate and enrich other gases from gas mixture streams that have low, dilute concentrations of the target gas. Other gases whose concentrations can be enriched by the gas separator cells include, but are not limited to, methane, sulfur dioxide, and nitrogen oxide gases, in addition to the enrichment of carbon dioxide.

The aforementioned advantages are example advantages, and not all advantages are discussed. Furthermore, embodiments of the present disclosure can exist that contain all, some, or none of the aforementioned advantages while remaining within the spirit and scope of the present disclosure.

Various aspects of the present disclosure are described by narrative text, flowcharts, description of apparatuses, block diagrams of assemblies, and/or block diagrams of a method and/or system applied to the operation of the apparatus and included in embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

The present invention will now be described in detail with reference to the Figures. The descriptions of the various embodiments of the present invention are presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

FIG. 1A depicts a functional block diagram illustrating a gas separation cell, in accordance with an embodiment of the present invention. Multiple gas separation cells are included in a parallel arrangement that makes up a stage of the enrichment assembly apparatus. The respective gas separation cells of the multiple gas separation cells are connected in a crossover manner in which a depleted gas flow of a first gas separator cell of a parallel arrangement directs the depleted gas flow to an input of a second gas separator cell of the same parallel arrangement. The depleted gas flow from the final or "nth" gas separator cell of a parallel arrangement is directed in a feedback flow to the input of the first gas separator cell of a previous stage of a parallel arrangement of multiple gas separation cells. A gas separation cell receives an input flow of a gas mixture that includes a plurality of component gases comprising the gas mixture and selectively increases the concentration of a target gas (i.e., one of the component gases of the gas mixture) by use of a gas permeable membrane that bifurcates the input portion of the gas separator cell from the output portion of the gas separator cell. The gas separator cell outputs the enriched concentration of the target gas (e.g., carbon dioxide) to the input of a gas separator cell of a parallel arrangement in a subsequent stage, creating a cascading series of gas enrichment stages. The gas separator cell includes gas inlet 101, enriched gas outlet 102, depleted gas outlet 103, gas permeable membrane 104, gas permeable support material 105, pressure seals 106, cell input portion 107, cell output portion 108, and chamber 109.

Gas inlet 101 is an entry orifice into cell input portion 107 and receives a pressurized gas mixture flow. Gas inlet 101 extends from an attachment point of the exterior of cell input portion 107 to a sufficient length enabling the connection of a tube carrying a gas mixture flow to gas inlet 101. In some embodiments gas inlet 101 is constructed of plastic or metal material, may be of a flexible or rigid build, and connects to gas inlet 101 with an air-tight connection fitting (not shown). Gas inlet 101 enables entry of the gas mixture to chamber 109 of a gas separator cell.

Enriched gas outlet 102 is an exit orifice from cell output portion 108 and extends from an attachment point of the exterior of cell output portion 108 to a sufficient length enabling the connection of a tube carrying an enriched gas mixture flow from cell output portion 108 of a gas separator cell. In some embodiments enriched gas outlet 102 is constructed of plastic or metal material may be of a flexible or rigid build, and connects an enriched gas flow to an input of a gas separator cell of a subsequent stage or a culminating output of a gas enrichment assembly. The enriched gas flow exiting from cell output portion 108 is carried by a tube or pipe connecting enriched gas outlet 102 to an input of a gas separator cell of a subsequent stage, using air-tight connection fittings (not shown). Enriched gas outlet 102 provides an exit of a gas flow of the enriched target gas, such as an enriched concentration of carbon dioxide.

Depleted gas outlet 103 is an exit orifice from output portion 108 and extends from a point of attachment of the exterior of cell input portion 107 to a sufficient length enabling the connection of a tube carrying the depleted gas from cell input portion 107 of the gas separator cell. In some embodiments depleted gas outlet 103 is constructed of plastic or metal material may be of a flexible or rigid build, and connects a depleted gas glow to an input of a gas separator cell. In some embodiments, the depleted gas from depleted gas outlet 103 flows by a tube or pipe connection to an input of another gas separator cell within the same parallel arrangement of the enrichment assembly. In embodiments in which depleted gas outlet 103 includes the depleted gas flow from the final or "nth" gas separator cell in a parallel arrangement of multiple gas separator cells, the depleted gas flow is connected to an input of an initial gas separator cell of a prior stage of parallel arrangements of gas separator cells, or the depleted gas flow from the "nth" gas separator cell is connected to an exhaust outlet from the initial parallel arrangement of gas separator cells in a cascading series of parallel arrangement of the enrichment assembly.

Gas permeable membrane 104 is selective in allowing the target gas to permeate the membrane preferentially over other gases with the input gas mixture to gas inlet 101. Gas permeable membrane 104 is positioned and sealed by compression of cell input portion 107 and cell output portion 108 and effectively bifurcates spaces formed by the connection of cell input portion 107 and cell output portion 108. Gas permeable membrane 104 is supported by gas permeable support material 105 positioned within the internal space of cell output portion 108. In some embodiments, gas permeable membrane 104 is made of silicone rubber material. A silicone membrane of 20 μm thickness is readily available and provides adequate gas separation of a target gas, such as carbon dioxide, from a gas mixture, such as atmospheric air. In some embodiments, the size (i.e., area) of gas permeable membrane 104 is constant from gas separator cell to gas separator cell within a parallel arrangement of a stage, and for the series of cascading stages. In other embodiments, the size of gas permeable membrane 104 varies from gas separator cell to gas separator cell within a parallel arrangement or may be constant within a parallel arrangement but vary from stage to stage.

Gas permeable support material 105 is positioned in the inner space section of cell output portion 108, below gas permeable membrane 104, and provides physical support of gas permeable membrane 104 against pressures applied to the input gas flow. Gas permeable support material 105 is constructed of a rigid material capable of providing physical support to gas permeable membrane 104 and is permeable to the target gas. In some embodiments, gas permeable support material 105 is a supporting matrix allowing the enriched gas flowing through gas permeable membrane 104 to pass with minimal resistance to enriched gas outlet 102. In some embodiments, open-cell polyurethane foam is used for gas-permeable support material 105 in lower-pressure applications. In other embodiments, for higher pressure applications, sintered metal, and metal foams are used for gas-permeable support material 105.

Pressure seal 106 provides an air-tight seal between cell input portion 107 compressed with cell output portion 108. Pressure seal 106 contacts an outer edge portion of gas-permeable membrane 104, holding the membrane in a fixed position. In some embodiments, pressure seal 106 is an "O" ring extending around the outer edge part of cell input portion 107 and cell output portion 108 and made of a compressible material that is not permeable to components of the gas mixture.

Cell input portion 107 is a component of gas separator cell 200 that includes gas inlet 101, depleted gas outlet 103, and includes an internal space forming chamber 109. Cell input portion 107 connects to cell output portion 108 with gas permeable membrane 104 positioned between cell input portion 107 and cell output portion 108. In some embodiments, cell input portion 107 may be constructed of metal, plastic, or rubber materials. In some embodiments, input portion 107 is constructed of polymethylmethacrylate (PMMA, or "Acrylic) material.

Cell output portion 108 is a component of gas separator cell 200 that includes enriched gas outlet 102 and includes an internal space occupied by gas permeable support material 105. Cell input portion 108 connects to cell input portion 107 with gas permeable membrane 104 positioned between cell input portion 107 and cell output portion 108. In some embodiments, cell output portion 108 may be constructed of metal, plastic, or rubber materials. In some embodiments, output portion 108 is constructed of polymethylmethacrylate (PMMA, or "Acrylic") material.

Chamber 109 is a space formed by the outer parts of input portion 107 and gas-permeable membrane 104. Chamber 109 receives a pressurized gas mixture flow from gas inlet 101. Chamber 109 enables gas mixture contact with gas permeable membrane 104 under pressurized conditions and includes depleted gas outlet 103 from which pressurized gas mixture with some of the target gas separated, exits chamber 109.

Figure 1B:
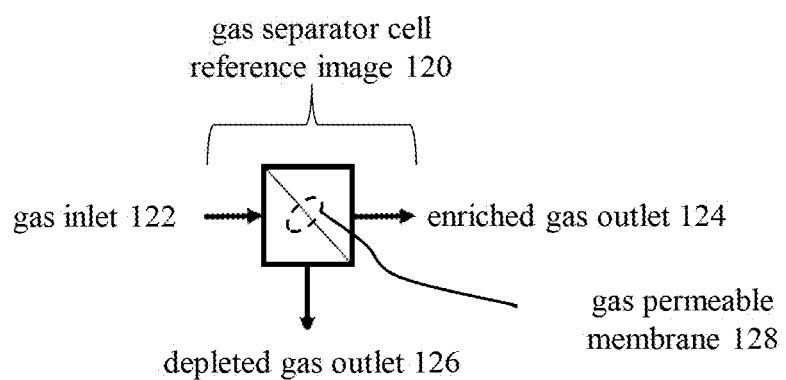
FIG. 1B depicts a symbol representing a gas separation cell as applied to FIG. 2, in accordance with an embodiment of the present invention.
Figure 2:
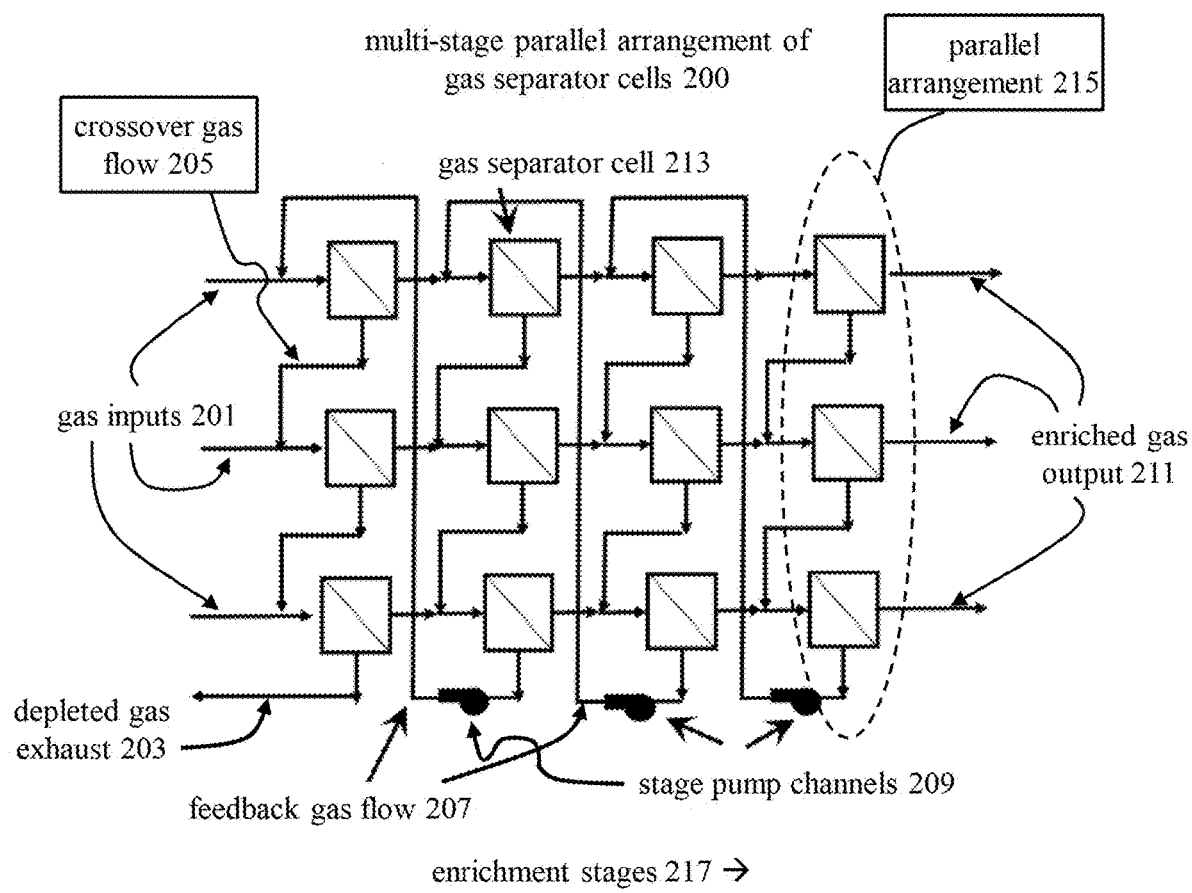
FIG. 2 depicts a block diagram of a separator cell cascade arrangement, in accordance with an embodiment of the present invention.

FIG. 1B depicts a symbol representing a gas separation cell as applied to FIG. 2, in accordance with an embodiment of the present invention. FIG. 1B includes gas separator cell reference image 120, gas inlet 122, enriched gas outlet 124, depleted gas outlet 126, and gas permeable membrane 128. Gas separator cell reference image 120 is used in a repeated manner to illustrate a structure of a parallel arrangement of gas separator cells and illustrate the cascade of parallel arrangements as a series of enrichment stages. Gas separator cell reference image 120 does not depict all the details of FIG. 1A, but the details and descriptions of the components and structure of a gas separator cell as depicted and described in FIG. 1A is implied in instances of gas separator cell representative images.

Gas inlet 122 receives a pressurized gas flow as input to a gas separator cell. In some embodiments of the present invention, gas inlet 122 may be an inlet of a gas separator cell receiving the initial gas mixture of a first-stage parallel arrangement. In other embodiments, gas inlet 122 may be receiving enriched gas flow from a prior stage of parallel arrangements, and may, in some embodiments, receive feedback flow from a subsequent stage of parallel arrangements or crossflow from another gas separator cell within the same parallel arrangement of the current stage.

Enriched gas outlet 124 includes a gas flow exiting gas separator cell reference image 120 that is more enriched in a target gas, such as carbon dioxide, as compared to the gas flow received by gas inlet 122. In some embodiments of the present invention, enriched gas outlet 124 provides an enriched gas flow as an input to a gas separator cell of parallel arrangement of a subsequent stage. In other embodiments, enriched gas outlet 124 may include a gas flow containing a final enrichment level of a target gas, such as carbon dioxide enriched from an initial input of atmospheric air.

Depleted gas outlet 126 includes a gas flow with some level of a target gas removed by passing through gas permeable membrane 128. As such, the depleted gas flow exiting gas separator cell reference image 120 contains a lower concentration of the target gas than the gas flow passing through gas inlet 122. In some embodiments of the present invention, depleted gas outlet 126 connects to an inlet of another gas separator cell within the same parallel arrangement structure. The crossflow of depleted gas connecting to an inlet of another gas separator cell enables the depleted gas flow to have additional contact with the surface of gas permeable membrane 128 and experience additional depletion of the target gas while accomplishing additional enrichment of the target gas in the exiting in an enriched gas outlet. In embodiments of the present invention, the depleted gas flow receives re-pressurization by a channel of a multichannel pump, to enable entry of the depleted gas flow into a corresponding gas inlet of another gas separator cell.

Gas permeable membrane 128 bifurcates gas separator cell reference image 120 and provides selective permeation of a target gas to pass through gas permeable membrane 128 and continue as an enriched gas flow exiting via enriched gas outlet 124. Gas permeable membrane 128 extends across a cavity within gas separator cell representative image 120 separating a chamber in which the input of a gas mixture is received from a corresponding chamber that is occupied by a supporting material providing protection of gas permeable membrane 128 due to the pressurized gas input. In some embodiments of the present invention, gas permeable membrane 128 is constructed of silicone and may be 20 μm in thickness.

FIG. 2 depicts a block diagram of a cascading series of parallel arrangements of separator cells, in accordance with an embodiment of the present invention. FIG. 2, as depicted, includes representative images of three gas separator cells within a stage of enrichment that constitutes a parallel arrangement, and a series of four cascading parallel arrangements. Each of the respective cascading parallel arrangements constitutes an enrichment stage and the combination of all stages is referred to as an enrichment assembly.

FIG. 2 illustrates an example enrichment assembly, but embodiments of the present invention are not limited by the number of gas separator cells within a parallel arrangement or the number of cascading parallel arrangement stages in a series constituting an enrichment assembly. It is noted that the number of gas separator cells applied to parallel arrangements can be used to attain the desired throughput of gas flow, and the number of stages of cascading parallel arrangements can be applied to achieve a desired level of target gas enrichment. It is also noted that the number of gas separator cells within a respective parallel arrangement does not necessarily have to match the number of gas separator cells in other parallel arrangements.

FIG. 2 includes gas inputs 201, depleted gas exhaust 203, crossover gas flow 205, feedback flow 207, stage pumps 209, enriched gas output 211, gas separator cells 213, parallel arrangement 215, and enrichment gas stages 217. In an embodiment of the present invention, gas inputs 201 illustrates three input flows to an initial stage of gas separator cells of an initial parallel arrangement of gas separator cells. Each of gas inputs 201 is illustrated as providing an input gas flow to respective gas separator cells of the initial parallel arrangement. In an embodiment of the present invention, the gas flow included in gas inputs 201 is pressurized and includes a gas mixture of which a target gas is a component typically at a low concentration relative to other components of the gas mixture (i.e., carbon dioxide at 0.04%, argon at 0.93%, oxygen at approximately 20.95%, and nitrogen at approximately 78.09% of air). It is noted that in the enrichment assembly, the output of enriched gas from a parallel arrangement of gas separator cells serves as the input to gas separator cells of a parallel arrangement of a subsequent stage.

Depleted gas exhaust 203 represents a gas flow that is depleted of a percentage of the target gas, such as carbon dioxide. Depleted gas exhaust 203 is gas flow removed from the enrichment assembly after the respective depleted gas output flow has passed through multiple gas separator cells of the initial parallel arrangement of the enrichment assembly.

Crossover gas flow 205 represents a gas flow from a depleted gas outlet of a first gas separator cell of a parallel arrangement to an input gas flow of a second gas separator cell of the same parallel arrangement, and from a second gas separator cell to an input gas flow of a third gas separator cell of the same parallel arrangement, and so forth. The "nth" gas separator cell depleted outlet of the second and subsequent stages feeds to a stage pump, such as stage pump 209 to repressurize the gas flow to an input as a feedback gas flow 207 to a prior parallel arrangement. Crossover gas flow 205 enables multiple contacts of gas flow with the gas permeable membrane of gas separator cells, such as gas separator cell 213, thus improving the enrichment of the target gas by multiple contacts with the gas permeable membrane.

Feedback gas flow 207 represents a gas flow from a depleted gas flow outlet of a last gas separator cell of a second or subsequent parallel arrangement. Feedback gas flow 207 is directed to stage pump 209 (i.e., a channel of a multichannel pump) for re-pressurization and is connected to an input of a first gas separator cell of a prior parallel arrangement, contributing to the multiple opportunities for depleted gas flows to contact a gas permeable membrane of a gas separator cell. Feedback gas flow 207 of a second stage feeds the re-pressurized gas flow to an input of a first gas separator cell of the parallel arrangement of a first stage, and feedback gas flow of a third stage feeds the re-pressurized depleted gas flow to a first gas separator cell input of the second stage, and so forth.

Stage pump 209 includes multiple channels that function to pressurize the depleted gas flows from a second stage or subsequent stage to enable the depleted gas flow to enter the input of a first gas separator cell of the parallel arrangement of a prior stage. In embodiments of the present invention, stage pump 209 includes individual gas flow channels of a single multichannel pump in which each channel provides re-pressurization of depleted gas flow for a stage of the cascading series of parallel arrangements. In an embodiment of the present invention, the channels of the multichannel pump are controlled to provide a desired pressure that enables the achievement of a desired throughput of gas flow and entry of depleted gas flow of one stage to be added to the input of gas flow to a first gas separator cell of a prior stage.

Enriched gas output 211 represents a gas flow exiting the enrichment assembly and includes a final level of target gas enrichment. In some embodiments, enriched gas output 211 includes a target gas concentration level enabling other techniques to capture and/or immobilize the target gas, such as carbon dioxide. For example, enriched gas output 211 may benefit the use of a temperature swing amine process to absorb and purify carbon dioxide.

Gas separator cell 213 represents one of the multiple instances of gas separator cells within a parallel arrangement and the multiple stages of parallel arrangements. Gas separator cell 213 includes a gas-permeable membrane, made of silicone for example, which is selectively favorable to allow certain target gases, such as carbon dioxide, to pass through while being less permeable to other gases, such as oxygen and nitrogen. The structure and features of gas separator cells 213 are more fully described in the discussion of FIG. 1A is presented above.

Parallel arrangement 215 represents a plurality of gas separator cells configured in a structure enabling gas flow throughput while providing enhancement of target gas enrichment by feeding the depleted gas flow of a first gas separator cell into the input gas flow of a second gas separator cell. Similarly, the depleted gas flow of a second gas separator cell is fed to the input gas flow of a third gas separator cell, and so forth. A final gas separator cell of parallel arrangement 215 is directed to a channel of a multichannel pump, such as a channel of stage pump 209, and is re-pressurized and directed to the input of a first gas separator cell of a prior stage parallel arrangement.

Enrichment stages 217 represents the progression of target gas enrichment as the input flow progresses through the gas separator cells of the parallel arrangements across multiple stages of cascading parallel arrangements. Embodiments of the present invention are not limited by the number of gas separator cells included in a parallel arrangement nor limited by the number of parallel arrangements in a cascading series comprising the enrichment assembly. It is noted that increasing the number of gas separator cells in a parallel arrangement contributes to the attainment of a throughput goal, and the number of cascading parallel arrangements contributes to attaining an enrichment goal.

Figure 3:
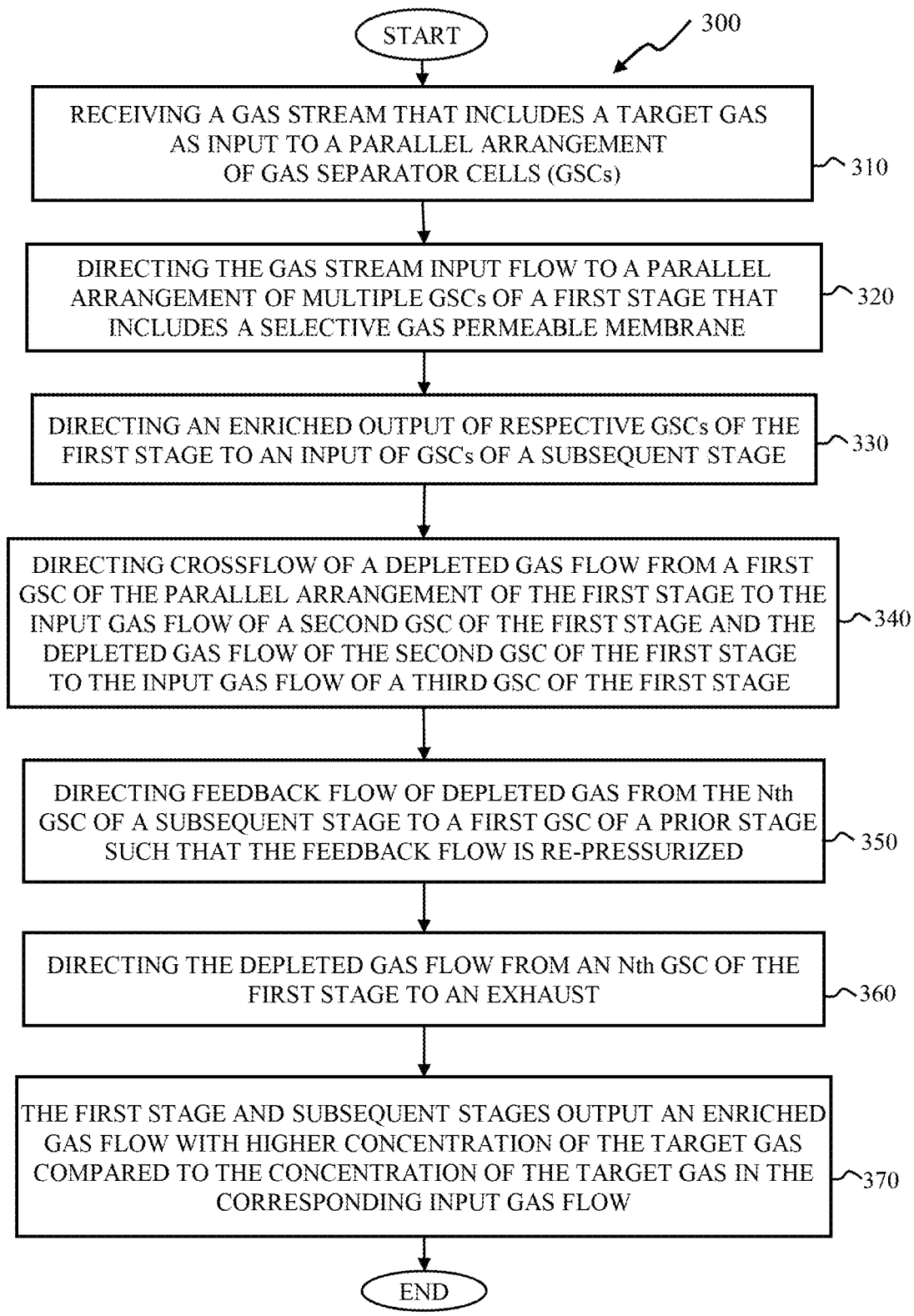
FIG. 3 depicts a flowchart of an enrichment operation utilizing the assembly apparatus depicted in FIG. 2 to enrich a concentration of a component gas in an output flow of a gas mixture flow as an input, in accordance with an embodiment of the present invention.

FIG. 3 depicts a flowchart of an enrichment operation 300 of the apparatus, depicted in FIG. 2, of a component gas in an output flow of a gas mixture flow as an input, in accordance with an embodiment of the present invention. In the discussion of FIG. 3 the component gas targeted for enrichment will be carbon dioxide; however, additional component gases may be enriched by the apparatus configuration and gas permeable membrane of silicone described herein, such as methane, sulfur dioxide, and nitrogen oxide gases.

Enrichment operation 300 begins by receiving a pressurized gas mixture as input flow to a parallel arrangement of gas separator cells (GSCs) that includes a target gas component (step 310). In some embodiments of the present invention, the target gas component of the gas mixture received is carbon dioxide. The concentration of carbon dioxide in the received pressurized input gas mixture is low (i.e., 0.04%). In some embodiments, the pressurized gas mixture input flow is balanced across all inputs to the apparatus.

Enrichment operation 300 directs the gas mixture input flow to a parallel arrangement that includes multiple gas separation cells of a first stage; the multiple gas separator cells include a gas permeable membrane selective to the target gas. In some embodiments, the gas mixture input flow is directed to inlets of the respective multiple gas separator cells such that the throughput of the gas mixture flow is balanced among the multiple gas separator cells of the first stage. The gas mixture input flow contacts the gas-permeable membrane of the respective gas separator cells allowing portions of the target gas of carbon dioxide to permeate through the membrane with minimal resistance while inhibiting other gas components of the gas mixture, effectively enriching the concentration of carbon dioxide in the gas output of the first stage parallel arrangement.

Enrichment operation 300 includes directing the enriched gas output from the gas separator cells of the parallel arrangement of the first stage to a corresponding input of a gas separator cell of a subsequent stage parallel arrangement (step 330). In some embodiments, the gas output of a respective gas separator cell of the first stage provides an enriched gas input flow to a respective gas separator cell of the second (subsequent) stage. In other embodiments, the gas output of a respective gas separator cell may be combined with the gas output of another gas separator cell of the first stage as input to one gas separator cell of the second stage. In yet other embodiments, the output of a respective gas separator cell of the first stage may be split and provide an enriched gas flow as input to two gas separator cells of the second stage. It is noted that the enrichment operation 300 proceeds to attain a certain throughput flow by sizing the number and size of the gas separator cells of a parallel arrangement for a given stage and determining the number of stages of parallel arrangements to attain a certain enrichment level of the target gas.

Enrichment operation 300 includes directing a crossflow of a depleted gas flow from a first gas separator cell of the parallel arrangement of the first stage to the input gas flow of a second gas separator cell of the (same) first stage, and the depleted gas flow of the second gas separator cells of the first stage is directed to the input gas flow of a third gas separator cell of the first stage (step 340). The crossover flow directs depleted gas to flow through the series of gas separator cells within the parallel arrangement of an enrichment stage, providing multiple opportunities for gas flow contact with a gas-permeable membrane of the multiple gas separator cells.

Enrichment operation 300 includes directing a feedback flow of depleted gas from the "nth" gas separator cell of a subsequent stage to a first gas separator cell of a prior stage (step 350). Enrichment operation 300 increases the contact of depleted gas with gas permeable membranes by directing a depleted gas flow from the last gas separator cell within a parallel arrangement of a current stage to the input flow of a first gas separator cell of a prior stage parallel arrangement.

Enrichment operation 300 includes directing the depleted gas flow from an "nth" gas separator cell of the first stage to an exhaust output for depleted gas (step 360). The feedback flows of each stage from the second stage to the final enrichment stage of parallel arrangements direct the depleted gas flow to the first gas separator cell of the parallel arrangement of the prior stage. The feedback flows from a depleted gas outlet of the last gas separator cell of a parallel arrangement is first connected to a channel of a multichannel pump to re-pressurize the flow enabling entry of the feedback flow to the input of the first gas separator cell of the prior stage. The depleted gas from the first stage of the multi-stage enrichment assembly exits a depleted gas outlet of the last gas separator cell of the first parallel arrangement as exhaust exiting the enrichment assembly.

Enrichment operation 300 results in the first stage and subsequent stages outputting an enriched gas flow with higher concentrations of the target gas as compared to the concentration of the target gas in the corresponding input gas flow, for each stage.

At each level of enrichment, the amount of effort required to enrich to the next increment varies with the concentration. At the extremes of low or high enrichment, it is entropically difficult to separate the gas. A value function is often used to indicate the value of the output of the enrichment process, which is the value of the enriched output plus the value of the depleted gas minus the value of the input material. A value function is presented in equation 1.

$$V(x)=(2x-1)\ln(x/1-x) \text{ where } x=\text{concentration of the enriched carbon dioxide.} \quad \text{Equation 1:}$$

It is noted that to maintain a desired throughput of gas flow and attain an enrichment goal within a stage of cascading parallel arrangements, consideration may be made to vary the size of the gas permeable membranes. An additional consideration in the cascading series of parallel arrangements is the number of pumps required. Depleted gas is re-pressurized and fed back to the upstream stages. Considerations to re-pressurize and feed depleted gas upstream include either modifying the area of the gas permeable membrane or modifying the relative pressure at which the gas separator cells of respective stages operate by using stage pumps. Enrichment assemblies that include higher numbers of stages require a significant amount of pump hardware to manage the re-pressurization of feedback flows.

Embodiments of the present invention include the use of a multichannel pump head in which a channel of the multichannel pump head provides re-pressurization of one feedback flow, and the single pump includes multiple channels or stacked pumping heads to handle multiple feedback flows. Different types of pumps may be used for re-pressurizing depleted gas feedback flows including, but not limited to, a rotary lobe pump, a progressive cavity pump, a rotary gear pump, a piston pump, a diaphragm pump, a screw pump, a gear pump, a peristaltic pump, and a scroll pump. An advantageous attribute of the pump selection is that the pumping mechanism includes multiple channels or has multiple pump heads stacked on a single shaft of a pump motor.

It is noted that an embodiment of the present invention may take the form of a system and may include a method of operation of the apparatus described herein, and the method of operation may include detailed controls by a computer program product or computer system providing control of throughput and enrichment goals at any possible technical detail level of integration.

Aspects of the present invention are described herein with reference to flowchart illustrations and/or block diagrams of an apparatus, according to embodiments of the invention. The flowchart and block diagrams in the FIG.s illustrate the architecture, functionality, and operation of possible implementations of an apparatus and/or system according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of the special purpose hardware and operation instructions.

What is claimed is:

1. An apparatus for enriching a concentration of a first gas of a gas mixture flow, the apparatus comprising:
    a plurality of gas separator cells including a first set configured in a parallel arrangement constituting a first stage;
    one or more subsequent stages including respective subsequent sets of gas separator cells configured in a parallel arrangement, a gas separator cell of a respective subsequent stage receiving an output of a corresponding gas separator cell of a prior stage as input;
    the gas separator cell of the plurality of gas separator cells including an input portion that includes a gas inlet and a depleted gas outlet, the input portion connected to an output portion that includes an outlet, the outlet including an enriched gas flow of a target gas connecting to a corresponding separator cell input portion inlet of a subsequent stage;
    the gas separator cell including a chamber formed by an air-tight connection of the input portion and the output portion with a selective gas-permeable membrane bifurcating the chamber;
    the output portion chamber of the gas separator cell including a gas-permeable material supporting the gas-permeable membrane;
    the depleted gas outlet of a first gas separator cell of the parallel arrangement of a first stage connects to an input feed of a second gas separator cell of the first stage, and the depleted gas outlet of an "nth" gas separator cell of the first stage connects to an exhaust output;
    the depleted gas outlet of an "nth" gas separator cell of a second stage connects to an input feed of the first gas separator cell of the first stage;
    at least one multichannel pump head connected to a shaft of a single pump motor providing pressurization of the depleted gas outlet flow to respective input feeds; and
    a final stage output of respective gas separator cells of a final parallel arrangement providing an enriched gas flow of the target gas.

2. The apparatus of claim 1, wherein the gas-permeable membrane is a silicone membrane.

3. The apparatus of claim 2, wherein the silicone membrane is 20 microns or less in thickness.

4. The apparatus of claim 1, wherein the gas-permeable material is made of open-cell polyurethane foam.

5. The apparatus of claim 1, wherein the gas-permeable material is made of sintered metal or metal foams.

6. The apparatus of claim 1, wherein a surface roughness of the gas-permeable material supporting the selective gas-permeable membrane is similar in magnitude to a thickness of the gas-permeable membrane.

7. The apparatus of claim 1, wherein the gas separator cell is constructed of polymethylmethacrylate (PMMA) material.

8. The apparatus of claim 1, wherein tubes constructed of metal or plastic are connected to input orifices, output orifices, and depleted gas outlet orifices.

9. The apparatus of claim 1, wherein the input portion and the output portion of the gas separator cell include an "O" ring providing a pressure seal of the gas separator cell and the selective gas-permeable membrane.

10. The apparatus of claim 1, wherein the gas-permeable membrane of the gas separator cell is of a variable area corresponding to a respective stage and a desired pressure profile of an enrichment assembly.

11. The apparatus of claim 1, wherein respective channels of the at least one multichannel pump head connected to a single pump motor shaft are sized at each stage enabling a constant size of the selective gas permeable membranes within a respective stage.

12. The apparatus of claim 11, wherein the multichannel pump head is connected to a peristaltic pump.

13. The apparatus of claim 1, further comprising:
   sizing a pressure of a stage channel of a multichannel pump head to enable a constant size gas permeable membrane for a respective stage.

14. The apparatus of claim 1, further comprising:
   sizing the gas permeable membrane of gas separator cells of a stage to enable constant pressurization for the stage.

15. The apparatus of claim 1, wherein the at least one multichannel pump head connected to the shaft of the single pump motor providing pressurization of the depleted gas outlet flow to the respective input feeds is a multichannel peristaltic pump.

* * * * *